(12) United States Patent
Kim et al.

(10) Patent No.: US 11,411,717 B2
(45) Date of Patent: Aug. 9, 2022

(54) ELECTRONIC DEVICE FOR SPEECH SECURITY WITH LESS ENVIRONMENTAL SOUND DISTORTION AND OPERATING METHOD THEREOF

(71) Applicant: THINKWARE CORPORATION, Seongnam-si (KR)

(72) Inventors: Daewon Kim, Seongnam-si (KR); Yeongjin Seo, Seongnam-si (KR); Tae-kyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 184 days.

(21) Appl. No.: 16/984,503

(22) Filed: Aug. 4, 2020

(65) Prior Publication Data

US 2021/0044425 A1  Feb. 11, 2021

(30) Foreign Application Priority Data

Aug. 5, 2019  (KR) .......................... 10-2019-0094700
Jul. 30, 2020  (KR) .......................... 10-2020-0095382

(51) Int. Cl.
*H04L 9/06* (2006.01)
*H04L 9/08* (2006.01)

(52) U.S. Cl.
CPC .......... *H04L 9/0643* (2013.01); *H04L 9/0825* (2013.01); *H04L 2209/60* (2013.01)

(58) Field of Classification Search
CPC ... H04L 9/0643; H04L 9/0825; H04L 9/0891; H04L 9/321; H04L 9/3242; H04L 2209/60; G06F 21/6209
See application file for complete search history.

(56) References Cited

U.S. PATENT DOCUMENTS

2018/0331824 A1* 11/2018 Racz .................... G08B 13/196

* cited by examiner

*Primary Examiner* — Minh Dinh
(74) *Attorney, Agent, or Firm* — WHDA, LLP

(57) ABSTRACT

An electronic device and an operating method thereof according to various example embodiments may be configured to acquire video data and audio data, to scramble audio data of a time interval (ΔT) in non-time order, and to store the video data and the scrambled audio data together. According to an example embodiment, the time interval (ΔT) may be fixed to be the same with respect to continuous audio data. According to another example embodiment, the time interval (ΔT) may vary using a function of receiving an input of a secret key and order and outputting a unique value, such as a Hash-based Message Authentication Codes (HMAC)-based One-time Password (HOTP) algorithm.

20 Claims, 13 Drawing Sheets

ELECTRONIC DEVICE FOR SPEECH SECURITY WITH LESS ENVIRONMENTAL SOUND DISTORTION AND OPERATING METHOD THEREOF

TECHNICAL FIELD

Various example embodiments relate to an electronic device for speech scrambling and an operating method thereof.

RELATED ART

In general, an electronic device provides various services by performing various functions in combination. For example, the electronic device may collect each of video data and audio data about a surrounding environment and may record the video data and the audio data together, such that a surrounding situation at a specific time may be grasped later. Here, the audio data may unintentionally include speech of a person. Therefore, contents of undesired speech may be disclosed when the audio data is reproduced to grasp the surrounding situation.

A privacy issue may be solved by scrambling speech. However, in a case in which the environmental sound is important, it is difficult to scramble audio data such that only contents of speech may not be perceived and the environmental sound may be perceived since a frequency band of the environmental sound and a frequency band of the speech widely overlap.

DETAILED DESCRIPTION

Subject

Various example embodiments provide an electronic device that may scramble audio data such that contents of speech of a user may not be perceived and the environmental sound may be perceived from audio data input to a microphone, and an operating method thereof.

Solution

An electronic device according to various example embodiments may include a camera module configured to collect a video signal, an input module configured to collect an audio signal while the video signal is being collected, and a processor configured to connect to the camera module and the input module. The processor may be configured to acquire video data and audio data, scramble the audio data in non-time order, and store the video data and the scrambled audio data together.

An operating method of an electronic device according to various example embodiments may include acquiring video data and audio data, scrambling the audio data in non-time order, and storing the video data and the scrambled audio data together.

Effect

According to various example embodiments, an electronic device may scramble audio data such that contents of speech of a user may not be perceived and the environmental sound may be perceived from audio data. The electronic device may scramble the audio data in non-time order, thereby making contents of speech become ambiguous in the audio data. Therefore, when the electronic device or an external device reproduces video data and audio data later, contents according to speech of the audio data may not be perceived by a listener. Meanwhile, the environmental sound is less sensitive to time order compared to speech and does not include contents according to the time order. Therefore, as long as a frequency does not significantly vary, the environmental sound is still perceptible by the listener although scrambled to change the time order. As described above, although speech of a speaker and surrounding noise are simultaneously input to audio data, the present disclosure may scramble the input audio data in non-time order using a characteristic that noise is less sensitive to time than speech, such that the noise may be perceived by a third party and the speech of the speaker may not be perceived by the third party.

Here, the electronic device may scramble audio data of a time interval ($\Delta T$). According to an example embodiment, the time interval ($\Delta T$) may be fixed to be the same with respect to continuous audio data. According to another example embodiment, the time interval ($\Delta T$) may vary using a function of receiving a secret key and a counter and outputting a unique value, such as a Hash-based Message Authentication Codes (HMAC)-based One-time Password (HOTP) algorithm. In this case, for descrambling the scrambled audio data such that contents of speech as well as environmental sound may be perceived, a time interval ($\Delta T$) in which scrambling in non-time order is performed at a corresponding audio data location is found through a function and a secret key used to determine the same and audio samples within the corresponding time interval ($\Delta T$) need to be returned from non-time order to time order.

DETAILED DESCRIPTION TO CARRY OUT THE DISCLOSURE

Hereinafter, various example embodiments of the present specification are described with reference to the accompanying drawings.

Figure 1:
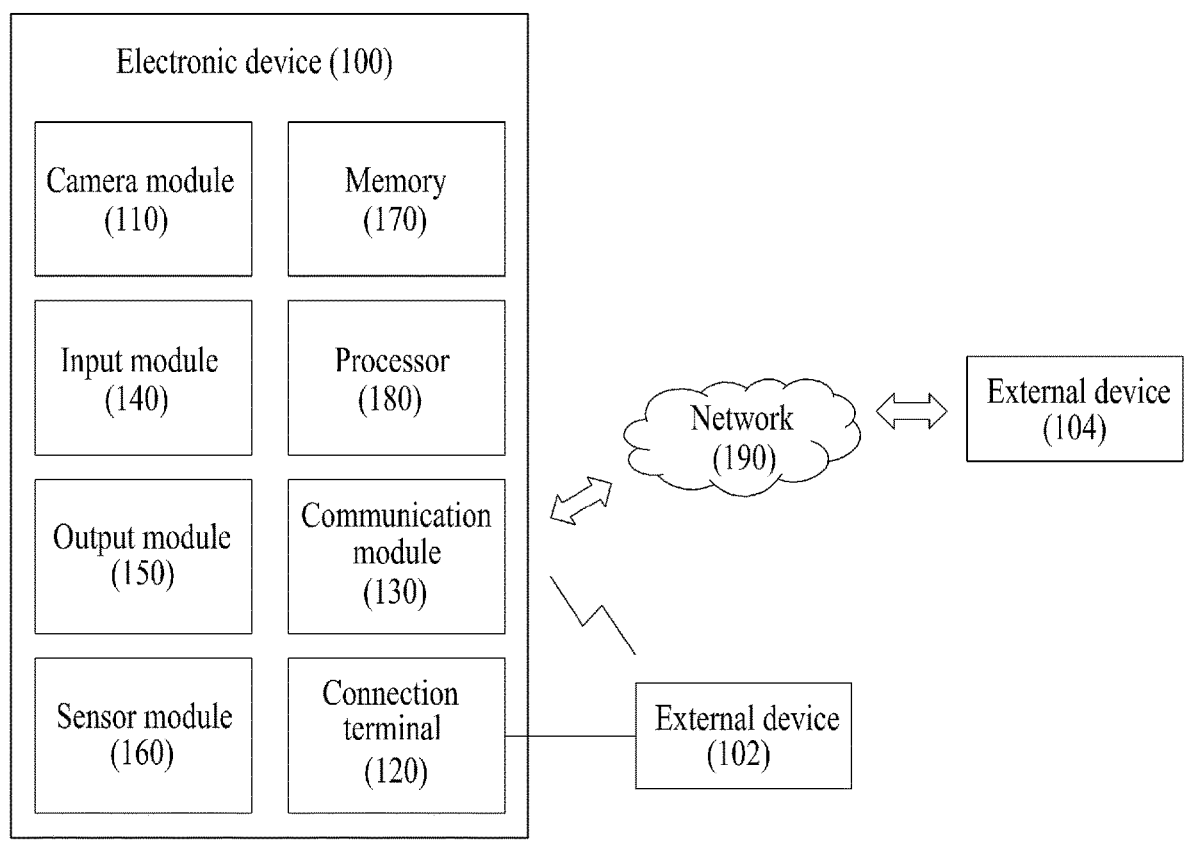
FIG. 1 is a diagram illustrating an electronic device according to various example embodiments.

FIG. 1 is a diagram illustrating an electronic device 100 according to various example embodiments.

Referring to FIG. 1, the electronic device 100 according to various example embodiments may include at least one of a camera module 110, a connection terminal 120, a communication module 130, an input module 140, an output module 150, a sensor module 160, a memory 170, and a processor 180. In some example embodiments, at least one of components of the electronic device 100 may be omitted and at least one another component may be added. In some example embodiments, at least two of the components of the electronic device 100 may be configured as a single integrated circuit. For example, the electronic device 100 may include at least one of a black box, a smartphone, a mobile phone, a computer, a laptop computer, a digital broadcasting terminal, personal digital assistants (PDA), a portable multimedia player (PMP), a tablet PC, a game console, a wearable device, an Internet of things (IoT) device, and a robot.

The camera module 110 may capture a video in the electronic device 100. Here, the camera module 110 may be provided at a predetermined position of the electronic device 100 and may capture a video. Through this, the camera module 110 may collect a video signal. For example, the camera module 110 may include at least one of a lens, at least one image sensor, an image signal processor, and a flash.

The connection terminal 120 may physically connect to an external device 102 in the electronic device 100. For example, the external device 102 may include another electronic device. To this end, the connection terminal 120 may include at least one connector. For example, the connector may include at least one of a high-definition multimedia interface (HDMI) connector, a universal serial bus (USB) connector, a secure digital (SD) card connector, and an audio connector.

The communication module 130 may communicate with the external device 102, 104 in the electronic device 100. The communication module 130 may establish a communication channel between the electronic device 100 and the external device 102, 104 and may communicate with the external device 102, 104 through the communication channel. Here, the external device 102, 104 may include at least one of a satellite, a base station, a server, and another electronic device. The communication module 130 may include at least one of a wired communication module and a wireless communication module. The communication module 130 may connect to the external device 102 in a wired manner through the connection terminal 120 and may communicate with the external device 102 in the wired manner. The wireless communication module may include at least one of a near field communication module and a far field communication module. The near field communication module may communicate with the external device 102 through a near field communication scheme. For example, the near field communication scheme may include at least one of Bluetooth, wireless fidelity (WiFi) direct, and infrared data association (IrDA). The far field communication module may communicate with the external device 104 through a far field communication scheme. Here, the far field communication module may communicate with the external device 104 over a network 190. For example, the network 190 may include at least one of a cellular network, the Internet, and a computer network, such as a local area network (LAN) and a wide area network (WAN).

The input module 140 may receive an input of a signal to be used for at least one component of the electronic device 100. The input module 140 may receive, from a user, an instruction or data to be used for the processor 180 and may generate a signal. Here, the input module 140 may collect an audio signal. For example, the input module 140 may include at least one of a microphone, a mouse, and a keyboard. In some example embodiments, the input module 140 may include at least one of a touch circuitry configured to detect a touch and a sensor circuitry configured to measure magnitude of a force generated in response to the touch.

The output module 150 may output information of the electronic device 100. The output module 150 may include at least one of a display module configured to visually output information and an audio output module configured to output information using an audio signal. For example, the display module may include at least one of a display, a hologram device, and a projector. For example, the display module may be implemented as a touchscreen through being assembled to at least one of the touch circuitry and the sensor circuitry of the input module 140. For example, an audio output module may include at least one of a speaker and a receiver.

The sensor module 160 may generate an electrical signal or a data value corresponding to an internal operation state (e.g., power or temperature) or an external environmental state of the electronic device 100. For example, the sensor module 160 may include at least one of a radar sensor, a light detection and ranging (LIDAR) sensor, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, and an illumination sensor.

The memory 170 may store a variety of data used by at least one component of the electronic device 100. For example, the memory 170 may include at least one of a volatile memory and a non-volatile memory. Data may include at least one program and input data or output data related thereto. The program may be stored in the memory 170 as software that includes at least one instruction and may include, for example, at least one of an operating system (OS), middleware, and an application.

The processor 180 may control at least one component of the electronic device 100 by executing the program of the memory 170. Through this, the processor 180 may perform data processing or operation. Here, the processor 180 may execute an instruction stored in the memory 170. The processor 180 may acquire video data through the camera module 110 and may acquire audio data through the input module 140. The processor 180 may store the video data and the audio data together. Here, the processor 180 may scramble the audio data. The audio data may include at least one of speech of a person and environmental sound about a surrounding environment. For example, when the electronic device 100 is present within a vehicle, the environmental sound may include at least one of horn sound, brake sound, turn indicator sound, fricative sound, and collision sound.

According to an example embodiment, the processor 180 may scramble audio data within a predetermined time interval ($\Delta T$) in non-time order. When the audio data includes speech of the user and the environmental sound, the audio data is scrambled in non-time order and accordingly, contents according to the speech become ambiguous in the audio data. Therefore, when playing the audio data later in the electronic device 100 or the external device 102, 104, the contents according to the speech of the audio data may not be perceptible by a listener. Meanwhile, the environmental sound does not include contents sensitive to time order. Therefore, although the audio data is scrambled, the environmental sound is still perceptible by the listener.

According to another example embodiment, the processor 180 may scramble audio data within a varying time interval ($\Delta T$). Here, to enhance scrambling in non-time order, the processor 180 may change the time interval ($\Delta T$) for scrambling in non-time order using an algorithm that outputs unique numerical values based on a secret key, such as a Hash-based Message Authentication Codes (HMAC)-based One-time Password (HOTP) algorithm. In this case, for descrambling the scrambled audio data to perceive contents of speech as well as environmental sound in the electronic device 100 or the external device 102, 104, a time interval ($\Delta T$) in which scrambling in non-time order is performed at a corresponding audio data location is found through a function and a secret key used to determine the same and audio samples within the corresponding time interval ($\Delta T$) need to be returned from non-time order to time order.

Figure 2A:
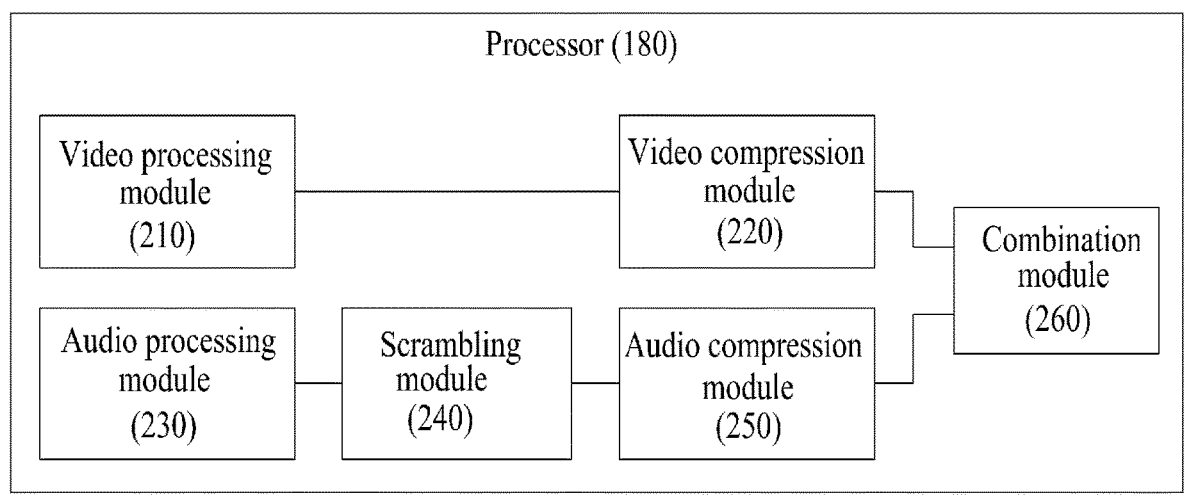
FIG. 2A is a diagram illustrating a processor for scrambling audio data of FIG. 1.
Figure 2B:
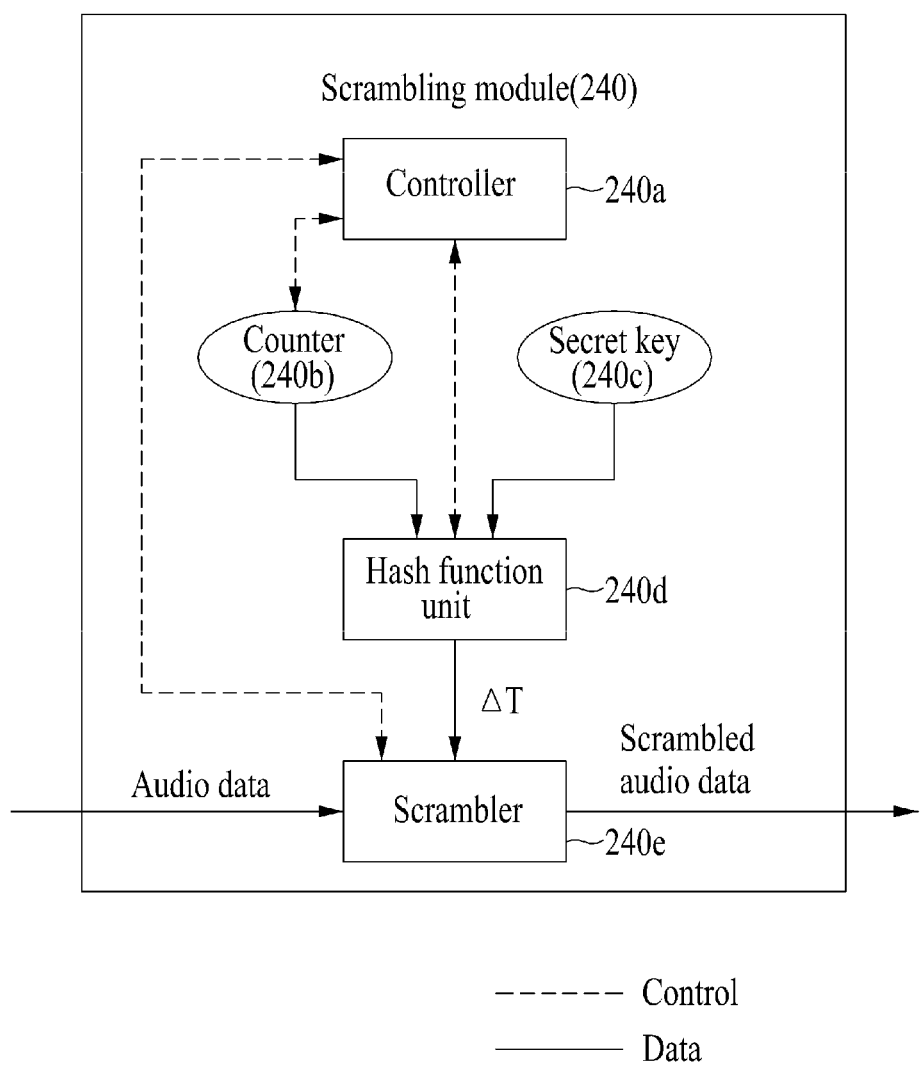
FIG. 2B is a diagram describing an example of a scrambling module of FIG. 2A.
Figure 3:
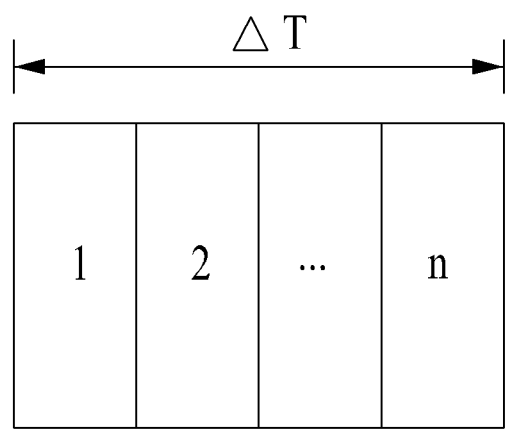
FIG. 3 illustrates audio data acquired at an electronic device according to various example embodiments.
Figure 4A:
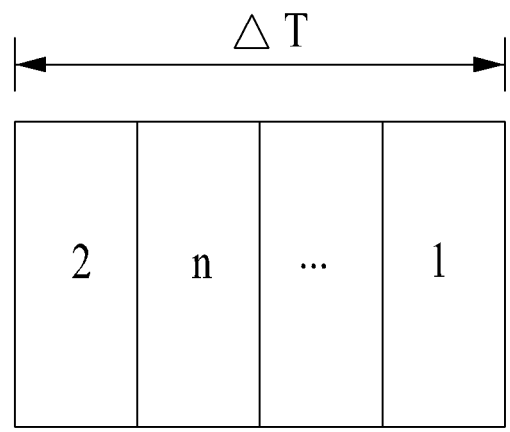
FIGS. 4A and 4B illustrate audio data processed at an electronic device according to various example embodiments.
Figure 4B:
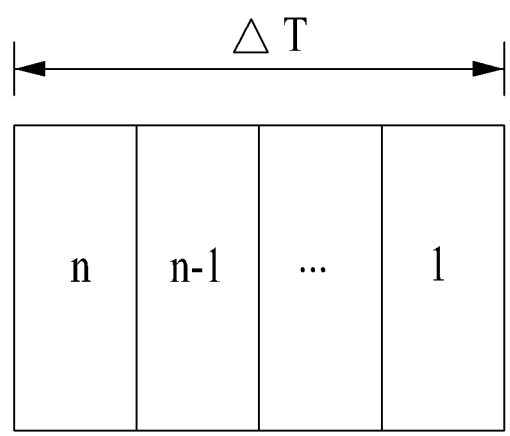
Figure 5:
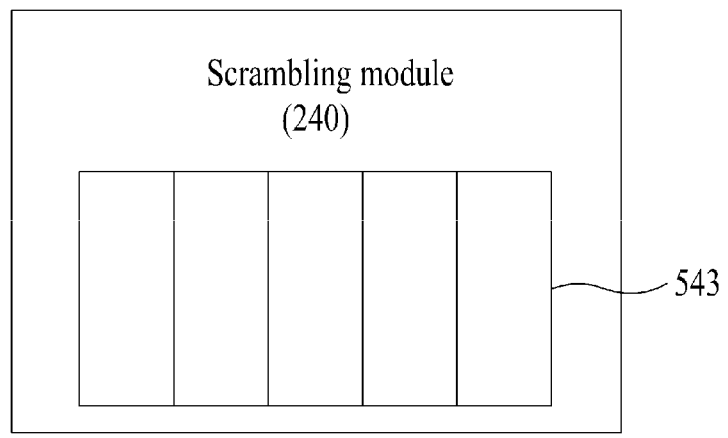
FIG. 5 illustrates a scrambling module of FIG. 2A.

FIG. 2A is a diagram illustrating the processor 180 for scrambling audio data of the electronic device 100 according to various example embodiments. FIG. 2B is a diagram describing an example of a scrambling module 240 of FIG. 2A. FIG. 3 illustrates audio data acquired at the electronic device 100 according to various example embodiments. FIGS. 4A and 4B illustrate audio data processed at the electronic device 100 according to various example embodiments. FIG. 5 illustrates the scrambling module 240 of FIG. 2A.

Referring to FIG. 2A, the processor 180 may include at least one of a video processing module 210, a video compression module 220, an audio processing module 230, a scrambling module 240, an audio compression module 250, and a combination module 260. In some examples, at least one of components of the processor 180 may be omitted and at least one another component may be added. In some examples, at least two of the components of the processor 180 may be configured as a single integrated circuit.

The video processing module 210 may process a video signal collected through the camera module 110. Through this, the video processing module 210 may acquire video data from the video signal. For example, the video processing module 210 may include at least one of an image signal processor (ISP), an image processing engine (IPE), and an image processing unit (IPU). The video processing module 120 may apply, to the video signal, at least one of geometric transformation, color correction, color transformation, noise cancellation, and sharpening.

The video compression module 220 may compress video data.

The audio processing module 230 may process an audio signal collected through the input module 140. Through this, the audio processing module 230 may acquire audio data from the audio signal. Here, the audio processing module 230 may convert an analog audio signal to a digital audio data. To this end, the audio processing module 230 may include, for example, an analog-digital converter (ADC). In addition, the audio processing module 230 may additionally apply at least one of signal amplification and noise cancellation to the audio signal.

The scrambling module 240 may scramble audio data. According to an example embodiment, the scrambling module 240 may scramble audio data based on a predetermined time interval ($\Delta T$). According to another example embodiment, the scrambling module 240 may scramble audio data based on a varying time interval ($\Delta T$). The scrambling module 240 may change the time interval ($\Delta T$) for scrambling in non-time order using an one-time password (OTP) generation algorithm that outputs unique values generated based on a secret key, such as an HOTP algorithm, thereby making it difficult to find out the corresponding time interval ($\Delta T$) at any point in time. In this manner, when the scrambling module 240 scrambles audio data, contents according to speech sensitive to time order may be imperceptible. That is, the contents according to the speech becomes ambiguous in the audio data. Therefore, in the case of reproducing the audio data later in the electronic device 100 or the external device 102, 104, the contents according to the speech of the audio data may not be precepted by a listener. Meanwhile, the environmental sound does not include information sensitive to time order. Therefore, although the audio data is scrambled, the environmental sound is still perceptible by the listener.

The scrambling module 240 according to an example embodiment acquires a time interval ($\Delta T$) for scrambling using an HOTP algorithm that uses a hash-based message authentication code. However, it is provided as an example only for clarity of description. An algorithm used to perform scrambling according to the present disclosure is not limited to the HOTP algorithm.

Hereinafter, a process of performing scrambling in the scrambling module 240 is further described.

To generate a time interval ($\Delta T$) for scrambling, a controller 240a of the scrambling module 240 stores a secret key 240c to be input to a hash function unit 240d and a counter 240b for counting a number of iterations, and updates the counter 240b and the secret key 240c in response to occurrence of an event. In detail, the controller 240a updates the counter 240b every time the hash function unit 240d outputs the time interval ($\Delta T$) for scrambling and updates the secret key 240c in response to occurrence of an event requiring updating of the secret key 240c. Updating of the secret key 240c may be performed by the controller 240a if a valid period of the secret key 240c expires, or in response to a request from an external authorized authentication server for updating the secret key 240c. Here, updating of the secret key 240c may be performed in response to receiving a new secret key from the external authentication server through the communication module 130 connected to the network 190 or in response to receiving the new secret key from the external device 102 connected through the connection terminal 120. Also, if the secret key 240c of the scrambling module 240a is updated, a secret key 750c stored in a descrambling module 750, which is described below, may need to be updated. The time interval ($\Delta T$) for scrambling generated by the hash function unit 240d according to the present disclosure may represent a length of audio data to be scrambled and may, generally, be a numeric value. For example, if the time interval ($\Delta T$) output from the hash function unit 240d is 10, scrambling may be performed based on a unit of 10. This unit may be a sample unit, a bit unit, or a time unit.

The controller 240a of the scrambling module 240 stores scrambling related information, such as, for example, a hash function, an HOTP value length, and a sorting algorithm, in addition to the secret key 240c and the counter 240b. The hash function is stored in the hash function unit 240d, and the hash function unit 240d inputs the counter 240b and the secret key 240c to the hash function under control of the controller 240a and outputs a result thereof to a scrambler 240e as the time interval (ΔT). Here, since the counter 240b is a value acquired by counting a number of times that the time interval (ΔT) is generated by the hash function unit 240d, the hash function unit 240d may generate the time interval (ΔT) using only the secret key 240c.

Also, the counter 240c is updated every time the input audio data is scrambled every time interval (ΔT) and thus, may represent a scrambling interval of the input audio data. Therefore, the controller 240a or the processor 180 may directly access a scrambling section desired to seek in the entire scrambled audio data, through the counter value. In this manner, a time for seeking a desired section in the entire audio data section may be reduced.

The scrambling related information may be prestored in the scrambling module 240, and may be received and stored by the processor 180 through the communication module 130 connected to the network 190. Based thereon, the scrambling module 240 may acquire the time interval (ΔT) from the counter 240b and the secret key 240c using the hash function as shown in FIG. 2B, and may scramble audio data based on the acquired time interval (ΔT). Here, the secret key and the hash function, the counter, and the HOTP value length may also need to be stored alike in the descrambling module 750 of FIG. 7 configured to descramble the audio data scrambled by the scrambling module 240. Although FIG. 2B describes that the counter 240b and the secret key 240c are input to the hash function unit 240d to output the time interval (ΔT), the hash function unit 240d may also output the time interval (ΔT) using the secret key 240c alone. Herein, since the counter 240b is a value counted every time the time interval (ΔT) is generated by the hash function unit 240d, the electronic device 100 may also determine a portion corresponding to a location of current audio data to be scrambled in the entire audio data based on the counter value.

Referring to FIG. 3, audio data of the time interval (ΔT) may include a plurality of audio samples discriminated from each other in a time domain. For example, the audio data may include n audio samples and the audio samples may be arranged in temporal order in which the respective audio samples are acquired. Through this, referring to FIG. 4A or 4B, the scrambling module 240 may scramble audio samples in the time domain. That is, the scrambling module 240 may rearrange the audio samples in the time domain. For example, referring to FIG. 4A, the scrambling module 240 may scramble the audio samples in order arbitrarily determined by an algorithm. As another example, referring to FIG. 4B, the scrambling module 240 may scramble the audio samples in reverse time order. In detail, the scrambler 240e of the scrambling module 240 may arrange audio data samples of the time interval (ΔT) in non-time order using a predetermined sorting algorithm.

To this end, referring to FIG. 5, the scrambling module 240 may include a buffer 543. For example, referring to FIG. 5, the buffer 543 may include a plurality of storage areas, and the scrambling module 240 may store audio data in the buffer 543 over time. Here, the scrambling module 240 may acquire each of audio samples over time and may store the audio samples in the storage areas of the buffer 543, respectively, and may also scramble the audio samples through the predetermined sorting algorithm, as shown in FIG. 4A or 4B.

The audio compression module 250 may compress the audio data.

The combination module 260 may combine the video data and the audio data. Here, the combination module 260 may combine the video data and the audio data based on the predetermined time interval (ΔT). For example, the combination module 260 may include a multiplexer (MUX). The combination module 260 may store the video data and the audio data together in the memory 170. Here, the combination module 260 may delay a start point in time of the video data by the time interval (ΔT) used by the scrambling module 240, may synchronize a start point in time of scrambled audio data and the start point in time of the video data, and may thereby store the video data and the audio data together.

The video data and the scrambled audio data compressed in the processor 180 may be combined by the combination module 260 and then transmitted to an external server connected to a wireless network through the communication module 130.

Figure 6:
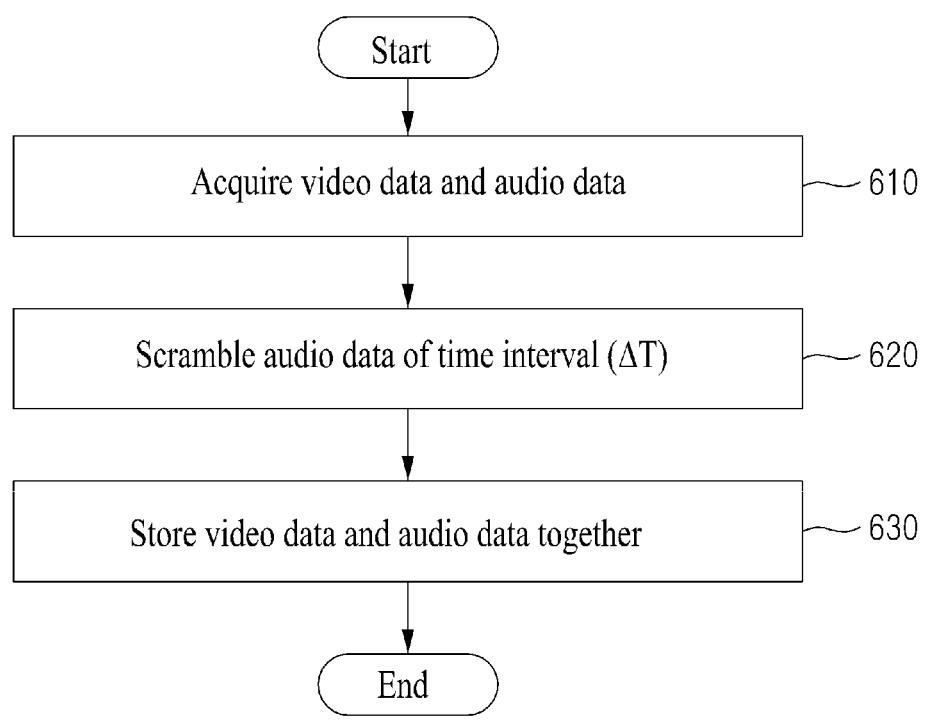
FIG. 6 is a flowchart illustrating an operating method of an electronic device according to various example embodiments.

FIG. 6 is a flowchart illustrating an operating method of the electronic device 100 according to an example embodiment.

Referring to FIG. 6, in operation 610, the electronic device 100 may acquire video data and audio data. The processor 180 may acquire the video data through the camera module 110 and, here, acquire the audio data through the input module 140. Here, the video processing module 210 may process the video signal collected through the camera module 110 and, through this, the video data may be acquired. Meanwhile, the audio processing module 230 may acquire the audio signal collected through the input module 140 and, through this, the audio data may be acquired. In operation 620, the electronic device 100 may scramble the audio data in non-time order. If the audio data includes speech and environmental sound, contents according to the speech becomes ambiguous in the audio data as the audio data is scrambled. Therefore, when reproducing the audio data later in the electronic device 100 or the external device 102, 104, the contents according to the speech of the audio data is imperceptible by a listener. Meanwhile, the environmental sound does not include contents sensitive to the time order. Therefore, although the audio data is scrambled, the environmental sound is still perceptible by the listener.

According to various example embodiments, the scrambling module 240 may scramble audio data. According to an example embodiment, the scrambling module 240 may scramble audio data based on a predetermined time interval (ΔT). According to another example embodiment, the scrambling module 240 may scramble audio data based on a varying time interval (ΔT). The scrambling module 240 may make it difficult to find out a corresponding time interval (ΔT) at any point in time by changing the time interval (ΔT) for scrambling in non-time order using an OTP generation algorithm that outputs unique numerical values generated based on a secret key, such as an HOTP algorithm.

In detail, the scrambling module 240 stores scrambling related information, such as, for example, a hash function and a secret key to be used for scrambling of the time interval (ΔT), a counter for counting a number of iterations, and an HOTP value length. The scrambling related information may be prestored in the scrambling module 240, and may be received and stored by the processor 180 through the communication module 130 connected to the network 190. Based thereon, referring to FIG. 2B, the scrambling module 240 may acquire the time interval (ΔT) from the counter 240b and the secret key 240c using the hash function, and may scramble audio data using the acquired time interval (ΔT). Here, the secret key and the hash function, the counter, and the HOTP value length need to be stored alike even in the descrambling module 750 of FIG. 7 configured to descramble the information descrambled by the scrambling module 240.

Referring to FIG. 3, audio data of the time interval (ΔT) may include a plurality of audio samples separate from each other in a time domain. For example, the audio data may include n audio samples, and the audio samples may be arranged in order of times at which the respective audio samples are acquired. Through this, referring to FIG. 4A or 4B, the scrambling module 240 may scramble the audio samples in the time domain. That is, the scrambling module 240 may rearrange the audio samples in the time domain. For example, as shown in FIG. 4A, the scrambling module 240 may scramble the audio samples in arbitrary order. As another example, as shown in FIG. 4B, the scrambling module 240 may scramble the audio samples in reverse time order.

In operation 630, the electronic device 100 may store the video data and the audio data together. The processor 180 may store the video data and the audio data together in the memory 170. To this end, the video compression module 220 may compress the video data, and the audio compression module 250 may compress the audio data. The combination module 260 may combine the video data and the audio data. Also, the combination module 260 may store the video data and the audio data in the memory 170. Here, the combination module 260 may store the video data and the audio data by synchronizing a start point in time of the video data and a start point in time of the scrambled audio data.

Figure 7A:
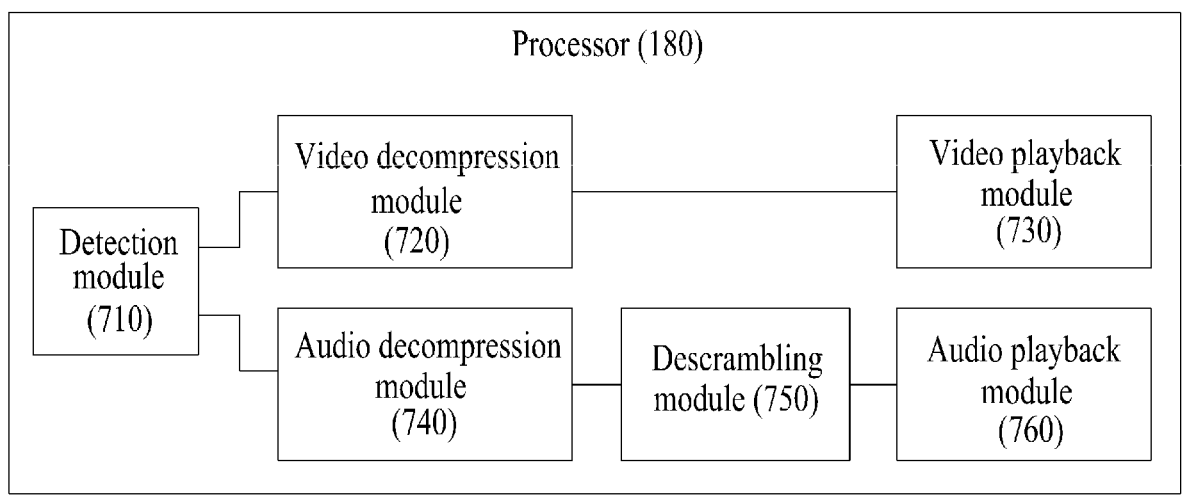
FIG. 7A is a diagram illustrating a processor for descrambling scrambled audio data of FIG. 1.
Figure 7B:
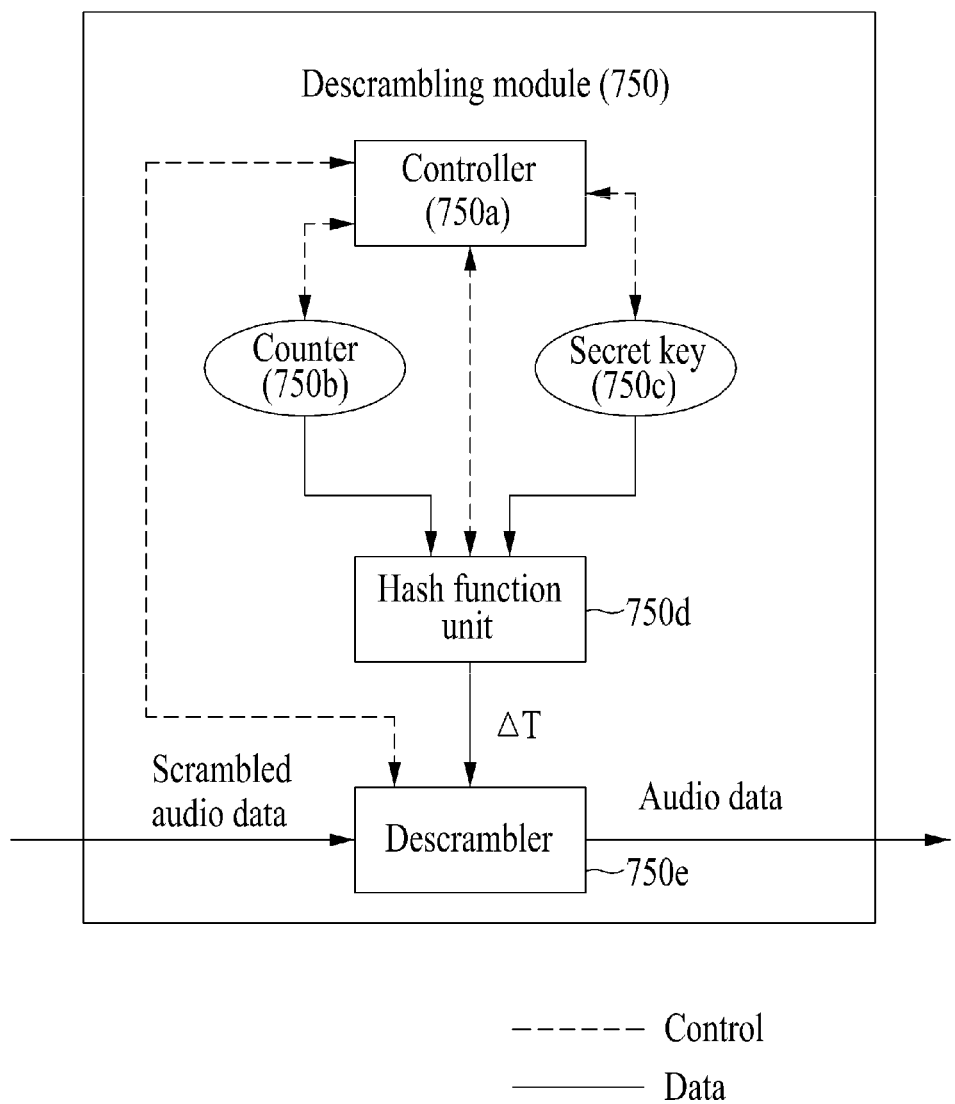
FIG. 7B is a diagram describing an example of a descrambling module of FIG. 7A.

FIG. 7A is a diagram illustrating the processor 180 for descrambling scrambled audio data of the electronic device 100 according to various example embodiments. FIG. 7B is a diagram describing an example of the descrambling module 750 of FIG. 7A.

Referring to FIG. 7A, the processor 180 may include at least one of a detection module 710, a video decompression module 720, a video playback module 730, an audio decompression module 740, the descrambling module 750, and an audio playback module 760. In some examples, at least one of components of the processor 180 may be omitted, and at least one another component may be added. In some examples, at least two of the components of the processor 180 may be configured as a single integrated circuit.

The detection module 710 may detect each of video data and audio data. Here, the detection module 710 may separate combined video data and audio data. For example, the detection module 710 may include a demultiplexer (De-MUX). According to an example embodiment, the detection module 710 may acquire the combined video data and audio data from the memory 170 and may detect each of the video data and the audio data from the combined video data and audio data. According to another example embodiment, the detection module 710 may receive the combined video data and audio data through the communication module 130 and may detect each of the video data and audio data from the combined video data and audio data.

The video decompression module 720 may decompress the video data.

The video playback module 730 may reproduce the video data. Here, the video playback module 730 may output the video data through the output module 150. For example, the video playback module 730 may reproduce the video data through a display module.

The audio decompression module 740 may decompress the audio data. Here, the decompressed audio data may be in a scrambled state.

The descrambling module 750 may descramble the scrambled audio data. According to an example embodiment, the descrambling module 750 may descramble the scrambled audio data based on the time interval (ΔT) predetermined for scrambling the audio data. According to another example embodiment, the descrambling module 750 may descramble the scrambled audio data based on the varying time interval (ΔT). The descrambling module 750 may find out the corresponding time interval (ΔT) for scrambling in non-time order at any point in time using an OTP generation algorithm that outputs unique values generated based on a secret key, such as an HOTP algorithm. In this manner, when the descrambling module 750 descrambles the scrambled audio data, audio samples within the corresponding time interval (ΔT) may be returned from non-time order to time order.

The descrambling module 750 according to an example embodiment may acquire a time interval (ΔT) to which scrambling is applied using an HOTP algorithm using a hash-based message authentication code. However, it is provided as an example only and an algorithm used to perform descrambling according to the present disclosure is not limited to the HOTP algorithm.

Hereinafter, a process of performing, by the descrambling module 750, descrambling is further described.

For descrambling of the time interval (ΔT), a controller 750a of the descrambling module 750 stores a secret key 750c to be used by a hash function unit 750d and a counter 750b for counting a number of iterations, and updates the secret key 750c and the counter 750b in response to occurrence of an event. In detail, the controller 750a updates the counter 750b every time the hash function unit 750d updates the time interval (ΔT) for descrambling and updates the secret key 750c in response to occurrence of an event requiring updating of the secret key 750c. Updating of the secret key 750c may be performed by the controller 750a if a valid period of the secret key 750c expires, or in response to a request from an external authorized authentication server for updating the secret key 750c. Here, updating of the secret key 750c may be performed in response to receiving a new secret key from the external authentication server through the communication module 130 connected to the network 190 or receiving the new secret key from the external device 102 connected through the connection terminal 120.

If the secret key 240c of the scrambling module 240 is updated, the external authorized authentication server may inform the descrambling module 750 of secret key updating of the scrambling module 240 through the communication module 130 and may transmit the updated secret key to the descrambling module 750. If the updated secret key is received, the controller 750a of the descrambling module 750 may update the existing secret key 750c with the new secret key and thereby store the new secret key. Therefore, the electronic device 100 according to the present disclosure may allow the secret key 240c of the scrambling module 240 and the secret key 750c of the descrambling module 750 to have the same information at all times.

The controller 750a of the descrambling module 750 stores scrambling related information, such as a hash function, a HOTP value length, and a sorting algorithm. The hash function is stored in the hash function unit 750d, and the hash function unit 750d inputs the counter 750b and the secret key 750c to the hash function under control of the controller 750a and outputs a result thereof to a descrambler 750e as the time interval (ΔT). Here, since the counter 750b is a value acquired by counting a number of times that the time interval (ΔT) is generated by the hash function unit 750*d*, the hash function unit 750*d* may generate the time interval (ΔT) using only the secret key 750*c*.

Also, the counter 750*c* is updated every time the scrambled audio data is descrambled every time interval (ΔT) and thus, may represent a descrambling interval of the scrambled audio data. Therefore, the controller 750*a* or the processor 180 may directly access an audio section desired to seek in the entire scrambled audio data or descrambled audio data, through the counter value. In this manner, a time for seeking a desired section in the entire audio data section may be reduced.

The descrambler 750*e* of FIG. 7 may restore the audio data by performing descrambling using the same sorting algorithm as that used in the scrambler 250*e* of FIG. 2 based on a unit of the time interval (ΔT) with respect to the input scrambled audio data. Therefore, the scrambling module 240 and the descrambling module 750 may share information about a method used to sort audio samples in a unit of the time interval (ΔT).

The scrambling related information may be prestored in the descrambling module 750, and may be received and stored by the processor 180 through the communication module 130 connected to the network 190. Based thereon, the hash function unit 750*d* of the descrambling module 750 may acquire the time interval (ΔT) from the counter 750*b* and the secret key 750*c* using the hash function, and may descramble the scrambled audio data based on the acquired time interval (ΔT). Here, the secret key and the hash function, the counter, and the HOTP value length, and sorting algorithm information also need to be stored alike in the scrambling module 240 having performed scrambling of the scrambled audio data.

The scrambled audio data of the time interval (ΔT) may include a plurality of audio samples discriminated from each other in a time domain. For example, referring to FIG. 4A or 4B, the scrambled audio data of the time interval (ΔT) may include scrambled n audio samples and the audio samples may be scrambled in in non-time order. For example, referring to FIG. 4A, the audio samples may be scrambled in order arbitrarily determined by an algorithm. As another example, referring to FIG. 4B, the audio samples may be scrambled in reverse time order. Through this, the descrambling module 750 may descramble the audio samples in the time domain as shown in FIG. 3. That is, the descrambling module 750 may rearrange the audio samples in the time domain. Through this, the audio samples may be arranged in time order.

The audio playback module 760 may reproduce the audio data. Here, the audio playback module 760 may output the audio data through the output module 150. For example, the audio playback module 760 may output the audio data through an audio output module. Here, contents according to speech as well as the environmental sound in the audio data is perceptible by the listener.

Figure 8:
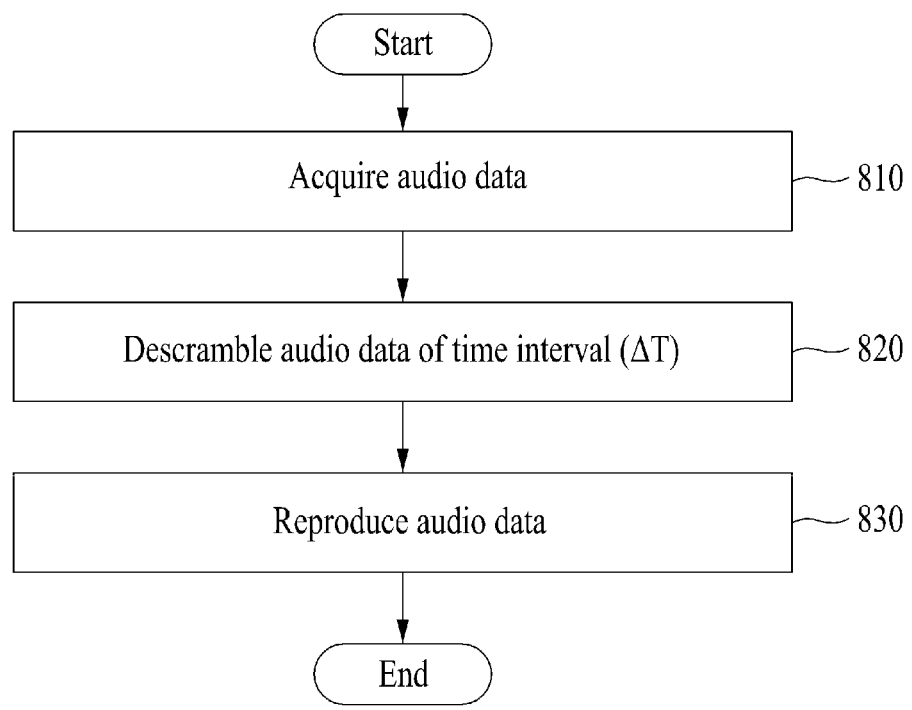
FIG. 8 is a flowchart illustrating an operating method of an electronic device according to various example embodiments.

FIG. 8 is a flowchart illustrating an operating method of the electronic device 100 according to various example embodiments.

Referring to FIG. 8, in operation 810, the electronic device 100 may acquire scrambled audio data. The processor 180 may detect each of the video data and audio the data. According to an example embodiment, the processor 180 may acquire the combined video data and audio data from the memory 170, and may detect each of the video data and the audio data from the combined video data and audio data. According to another example embodiment, the processor 180 may receive the combined video data and audio data through the communication module 1130 and may detect each of the video data and the audio data from the combined video data and audio data. To this end, the detection module 710 may separate the combined video data and audio data. The video decompression module 720 may decompress the video data. Also, the audio decompression module 740 may decompress the audio data. Here, the decompressed audio data may be in a scrambled state.

In operation 820, the electronic device 100 may descramble the scrambled audio data. As the scrambled audio data is descrambled, the contents according to speech as well as the environmental sound in the audio data may be perceptible.

According to various example embodiments, the descrambling module 750 may descramble the scrambled audio data. According to an example embodiment, the descrambling module 750 may descramble the scrambled audio data based on the time interval (ΔT) predetermined for scrambling the audio data. According to another example embodiment, the descrambling module 750 may descramble the scrambled audio data based on the varying time interval (ΔT). The descrambling module 750 may find out the corresponding time interval (ΔT) for scrambling in non-time order at any point in time using an OTP generation algorithm that outputs unique values generated based on a secret key, such as an HOTP algorithm. In this manner, when the descrambling module 750 descrambles the scrambled audio data, audio samples within the corresponding time interval (ΔT) may be returned from non-time order to time order.

In detail, the descrambling module 750 stores scrambling related information, such as, for example, a secret key and a hash function to be used for descrambling of the time interval (ΔT), a counter for counting a number of iterations, an HOTP value length, and sorting algorithm information. The scrambling related information may be prestored in the descrambling module 750 and may be received and stored by the processor 180 through the communication module 130 connected to the network 190. Based thereon, referring to FIG. 7, the descrambling module 750 may acquire the time interval (ΔT) from the counter 750*b* and the secret key 750*c* using the hash function and may descramble the scrambled audio data using the acquired time interval (ΔT). Here, the secret key and the hash function, the counter, the HOTP value length need to be stored alike in the scrambling module 240 having performed scrambling of the scrambled audio data.

The scrambled audio data of the time interval (ΔT) may include a plurality of audio samples discriminated from each other in the time domain. For example, referring to FIG. 4A or 4B, the scrambled audio data of the time interval (ΔT) may include scrambled n audio samples and the audio samples may be scrambled in in non-time order. For example, referring to FIG. 4A, the audio samples may be scrambled in order arbitrarily determined by an algorithm. As another example, referring to FIG. 4B, the audio samples may be scrambled in reverse time order. Through this, the descrambling module 750 may descramble the audio samples in the time domain as shown in FIG. 3. That is, the descrambling module 750 may rearrange the audio samples in the time domain. Through this, the audio samples may be arranged in time order.

In operation 830, the electronic device 100 may reproduce the audio data. Here, the audio playback module 760 may output the audio data through the output module 150. For example, the audio playback module 760 may output the audio data through the audio output module. Here, contents according to speech as well as the environmental sound in the audio data is perceptible by the listener. According to an example embodiment, while the video playback module 730 is outputting the video data, the audio playback module 760 may reproduce the audio data.

The electronic device 100 according to various example embodiments may include the camera module 110 configured to collect a video signal, the input module 140 configured to collect an audio signal while the video signal is being collected, and the processor 180 configured to connect to the camera module 110 and the input module 140.

According to various example embodiments, the processor 180 may be configured to acquire video data and audio data, to scramble the audio data in non-time order, and to store the video data and the scrambled audio data together.

According to various example embodiments, the processor 180 may include the scrambling module 240 configured to scramble the audio data in non-time order every time interval ($\Delta T$).

According to various example embodiments, the time interval ($\Delta T$) may be a length of the scrambled audio data.

According to various example embodiments, the time interval ($\Delta T$) may vary using an algorithm that generates a series of numerical values using a secret key. For example, the scrambling module 240 may be configured to acquire the time interval ($\Delta T$) from the secret key using a hash function, according to the algorithm. Here, at least one of the hash function and the secret key may be prestored in the scrambling module 240, or may be received from an outside and stored in the scrambling module 240. Meanwhile, at least one of the hash function and the secret key may be shared with the descrambling module 750 configured to descramble the scrambled audio data.

According to various example embodiments, the processor 180 may synchronize a start point in time of the video data with a start point in time of the scrambled audio data and may store the video data and the scrambled audio data together.

According to various example embodiments, the scrambling module 240 may scramble audio samples in the audio data of the time interval in non-time order arbitrarily determined in an algorithm. Here, the arbitrarily determined non-time order may be shared with the descrambling module 750 configured to descramble the scrambled audio data.

According to various example embodiments, the processor 180 may further include the video processing module 210 configured to process the video signal collected from the camera module 110 to the video data, the audio processing module 230 configured to process the audio signal collected from the input module 140 to the audio data, the audio compression module 250 configured to compress the scrambled audio data, and the video compression module 220 configured to compress the video data.

An operating method of the electronic device 100 according to various example embodiments may include acquiring video data and audio data, scrambling the audio data in non-time order, and storing the video data and the scrambled audio data together.

According to various example embodiments, the scrambling of the audio data in non-time order may include scrambling the audio data in non-time order at time intervals ($\Delta T$).

According to various example embodiments, the time interval ($\Delta T$) may be a length of the scrambled audio data.

According to various example embodiments, the time interval ($\Delta T$) may vary using an algorithm that generates a series of numerical values using a secret key. For example, the scrambling of the audio data of the time interval ($\Delta T$) in non-time order may include acquiring the time interval ($\Delta T$) from the secret key using a hash function, according to the algorithm, and scrambling the audio data of the time interval ($\Delta T$) in non-time order. Here, at least one of the hash function and the secret key may be prestored in the electronic device 100, or may be received from an outside and stored in the electronic device 100. Meanwhile, at least one of the hash function and the secret key may be shared with the descrambling module 750 configured to descramble the scrambled audio data.

According to various example embodiments, the storing of the video data and the scrambled audio data together may include synchronizing a start point in time of the video data with a start point in time of the scrambled audio data and storing the video data and the scrambled audio data together.

According to various example embodiments, the scrambling of the audio data of the time interval ($\Delta T$) in non-time order may include scrambling audio samples in the audio data of the time interval ($\Delta T$) in non-time order arbitrarily determined in an algorithm, and the arbitrarily determined non-time order may be shared with a descrambling module configured to descramble the scrambled audio data.

According to various example embodiments, the storing of the video data and the scrambled audio data together may include compressing the scrambled audio data, compressing the video data, and storing the compressed audio data and the compressed video data together.

According to various example embodiments, the electronic device 100 may scramble audio data such that contents of speech may not be perceived and the environmental sound may be perceived from the audio data. According to an example embodiment, the electronic device 100 may make the contents according to speech become ambiguous in the audio data by scrambling the audio data in non-time order. Therefore, when reproducing the video data and the audio data later in the electronic device 100 or the external device 102, 104, the contents according to the speech of the audio data may be imperceptible by a listener. Meanwhile, the environmental sound does not include contents according to time order. Therefore, as long as a frequency does not significantly vary, the environmental sound is still perceptible by the listener although the audio data is scrambled in the aforementioned manner.

Here, the electronic device 100 may scramble audio data of the time interval ($\Delta T$). According to an example embodiment, the time interval ($\Delta T$) may be fixed to be the same with respect to continuous audio data. According to another example embodiment, the time interval ($\Delta T$) may vary using a function of receiving a secret key and order and outputting a unique value, such as an HOTP algorithm. In this case, for descrambling the scrambled audio data such that contents of speech as well as environmental sound may be perceived, a time interval ($\Delta T$) in which scrambling in non-time order is performed at a corresponding audio data location is found through a function and a secret key used to determine the same and audio samples within the corresponding time interval ($\Delta T$) need to be returned from non-time order to time order.

Figure 9:
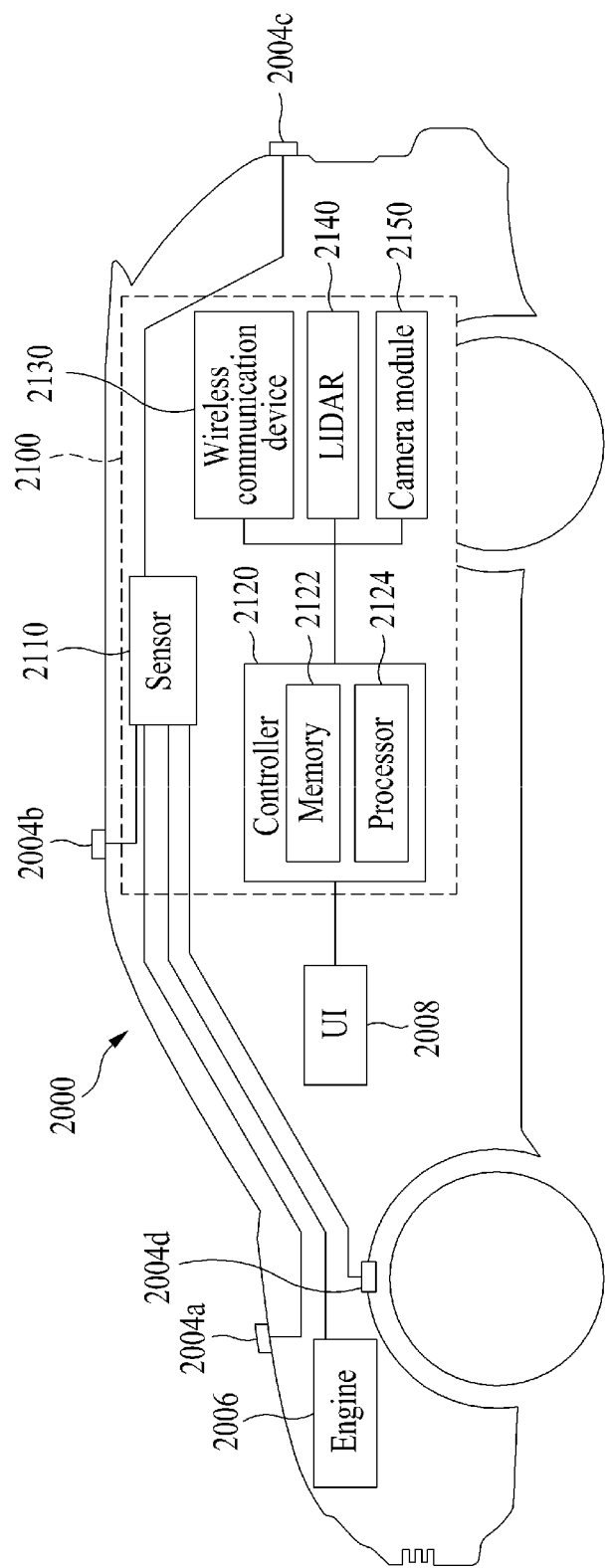
FIG. 9 illustrates a vehicle to which an electronic device according to various example embodiments is mounted.
Figure 10:
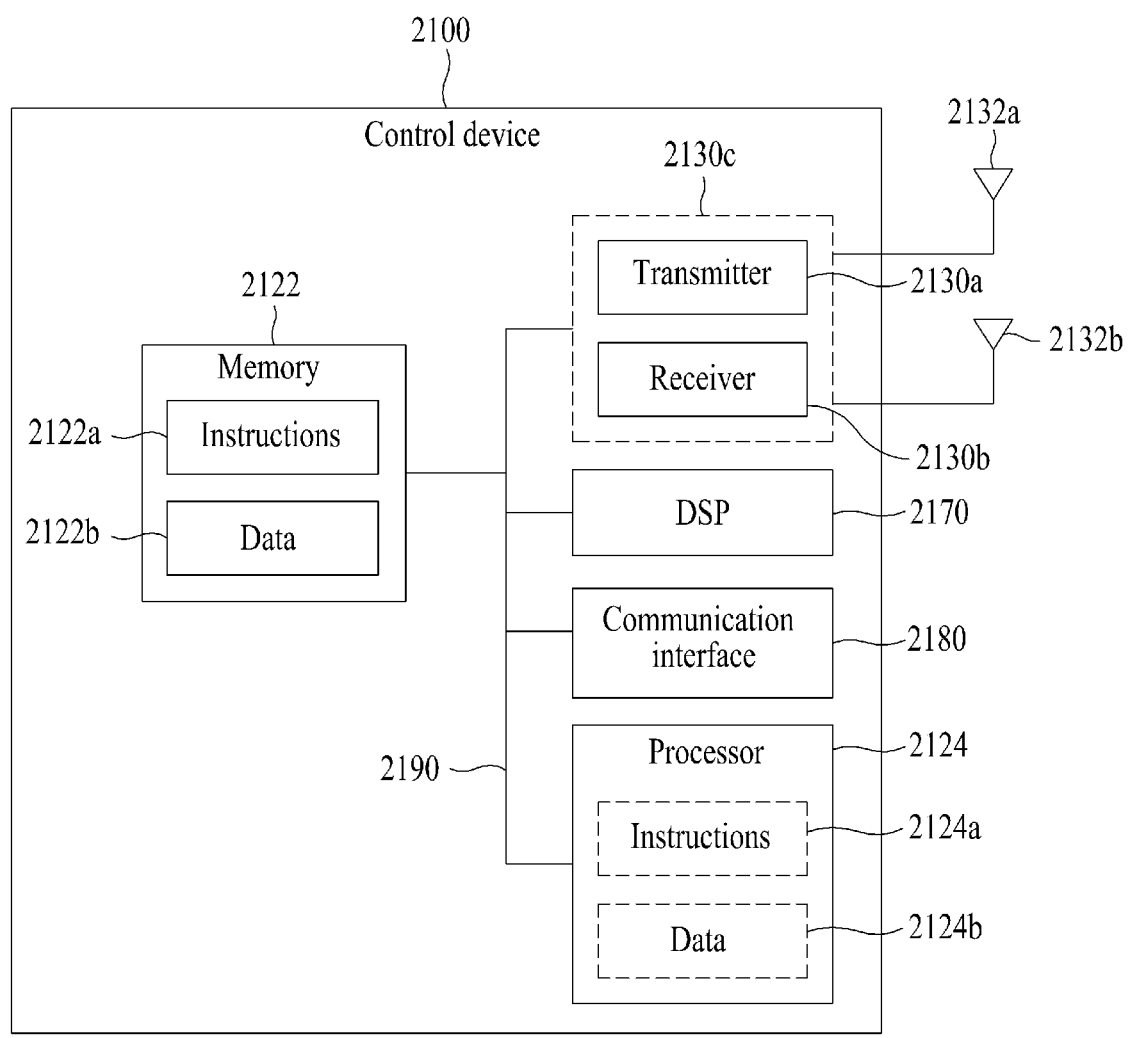
FIG. 10 illustrates the electronic device of FIG. 9.

FIG. 9 illustrates a vehicle to which the electronic device 100 according to various example embodiments is mounted, and FIG. 10 illustrates the electronic device 100 of FIG. 9.

Referring to FIGS. 9 and 10, a control device 2100 (e.g., the electronic device 100 of FIG. 1) according to various example embodiments may be mounted to a vehicle. Here, the vehicle may be an autonomous vehicle 2000.

According to various example embodiments, the control device 2100 may include a controller 2120 that includes a memory 2122 (e.g., the memory 170 of FIG. 1) and a processor 2124 (e.g., the processor 180 of FIG. 1), a sensor 2110 (e.g., the sensor module 160 of FIG. 1), a wireless communication device 2130 (e.g., the communication module 130 of FIG. 1), a LIDAR device 2140 (e.g., the sensor module 160 of FIG. 1), and a camera module 2150 (e.g., the camera module 110 of FIG. 1).

According to various example embodiments, the controller 2120 may be configured at a time of manufacture by a manufacturing company of the vehicle or may be additionally configured to perform an autonomous driving function after manufacture. Alternatively, a configuration to continuously perform an additional function by upgrading the controller 2120 configured at the time of manufacture may be included.

The controller 2120 may forward a control signal to the sensor 2110, an engine 2006, a user interface (UI) 2008, the wireless communication device 2130, the LIDAR device 2140, and the camera module 2150, which are included as other components in the vehicle. Although not illustrated, the controller 2120 may forward a control signal to an acceleration device, a braking system, a steering device, or a navigation device involved with driving of the vehicle.

According to various example embodiments, the controller 2120 may control the engine 2006. For example, the controller 2120 may sense a speed limit of a road on which the autonomous vehicle 2000 is driving and may control the engine 2006 such that a driving speed may not exceed the speed limit, or may control the engine 2006 to increase the driving speed of the autonomous vehicle 2000 within the range of not exceeding the speed limit. Additionally, when sensing modules 2004a, 2004b, 2004c, and 2004d sense an external environment of the vehicle and forward the same to the sensor 2110, the controller 2120 may receive the same, may generate a signal for controlling the engine 2006 or a steering device (not shown), and thereby control driving of the vehicle.

When another vehicle or an obstacle is present in front of the vehicle, the controller 2120 may control the engine 2006 or the braking system to decrease the driving speed and may also control a trajectory, a driving route, and a steering angle in addition to the speed. Alternatively, the controller 2120 may generate a necessary control signal based on recognition information of other external environments, such as, for example, a driving lane, a driving signal, etc., of the vehicle, and may control driving of the vehicle.

The controller 2120 may also control driving of the vehicle by communicating with a peripheral vehicle or a central server in addition to autonomously generating the control signal and by transmitting an instruction for controlling peripheral devices based on the received information.

Further, when a location or an angle of view of the camera module 2150 is changed, it may be difficult for the controller 2120 to accurately recognize a vehicle or a lane. To prevent this, the controller 2120 may generate a control signal for controlling a calibration of the camera module 2150. Therefore, the controller 2120 may generate a calibration control signal for the camera module 2150 and may continuously maintain a normal mounting location, direction, angle of view, etc., of the camera module 2150 regardless of a change in the mounting location of the camera module 2150 by a vibration or an impact occurring due to a motion of the autonomous vehicle 2000. When prestored information about an initial mounting location, direction, and angle of view of the camera module 2150 differs from information about the initial mounting location, direction, and angle of view of the camera module 2120 that is measured during driving of the autonomous vehicle 2000 by a threshold or more, the controller 2120 may generate a control signal for the calibration of the camera module 2150.

According to various example embodiments, the controller 2120 may include the memory 2122 and the processor 2124. The processor 2124 may execute software stored in the memory 2122 in response to the control signal from the controller 2120. In detail, the controller 2120 may store, in the memory 2122, data and instructions for scrambling audio data according to various example embodiments, and the instructions may be executed by the processor 2124 to perform at least one method disclosed herein.

Here, the memory 2122 may include a non-volatile recording medium executable at the processor 2124. The memory 2122 may store software and data through an appropriate external device. The memory 2122 may include random access memory (RAM), read only memory (ROM), hard disc, and a memory device connected to a dongle.

The memory 2122 may at least store an operating system (OS), a user application, and executable instructions. The memory 2122 may store application data and arrangement data structures.

The processor 2124 may be a controller, a microcontroller, or a state machine as a microprocessor or an appropriate electronic processor.

The processor 2124 may be configured as a combination of computing apparatuses. The computing apparatus may be configured as a digital signal processor, a microprocessor, or a combination thereof.

Also, according to various example embodiments, the control device 2100 may monitor a feature inside and/or outside the autonomous vehicle 2000 and may detect a status of the autonomous vehicle 2000 using at least one sensor 2110.

The sensor 2110 may include at least one sensing module 2004a, 2004b, 2004c, and 2004d. The sensing module 2004a, 2004b, 2004c, and 2004d may be provided at a specific location of the autonomous vehicle 2000 based on a sensing purpose. The sensing module 2004a, 2004b, 2004c, and 2004d may be provided in a lower portion, a rear portion, a front end, an upper end, or a side end of the autonomous vehicle 2000 and may be provided to an internal part of the autonomous vehicle 2000, a tier, and the like.

Through this, the sensing module 2004a, 2004b, 2004c, and 2004d may sense driving information, such as the engine 2006, the tier, a steering angle, a speed, a vehicle weight, and the like, as internal vehicle information. Also, the at least one sensing module 2004a, 2004b, 2004c, and 2004d may include an acceleration sensor, a gyroscope, an image sensor, a radar, an ultrasound sensor, a LIDAR sensor, and the like, and may sense motion information of the autonomous vehicle 2000.

The sensing module 2004a, 2004b, 2004c, and 2004d may receive state information of a road on which the autonomous vehicle 2000 is present, peripheral vehicle information, and feature data about an external environmental state, such as weather, as external information, and may sense a vehicle parameter according thereto. The sensed information may be stored in the memory 2122 temporarily or in long-term depending on purposes.

According to various example embodiments, the sensor 2110 may integrate and collect information of the sensing modules 2004a, 2004b, 2004c, and 2004d for collecting information occurring inside and outside the autonomous vehicle 2000.

The control device 2100 may further include the wireless communication device 2130 (e.g., the communication module 130).

The wireless communication device 2130 is configured to implement wireless communication with the autonomous vehicle 2000. For example, the wireless communication device 2130 enables the autonomous vehicle 2000 to communicate with a mobile phone of the user, another wireless communication device 2130, another vehicle, a central device (a traffic control device), a server, and the like. The wireless communication device 2130 may transmit and receive a wireless signal based on a wireless communication protocol. The wireless communication protocol may be WiFi, Bluetooth, Long-Term Evolution (LTE), code division multiple access (CDMA), wideband code division multiple access (WCDMA), and global systems for mobile communications (GSM). However, it is provided as an example only and the wireless communication protocol is not limited thereto.

Also, according to various example embodiments, the autonomous vehicle 2000 may implement vehicle-to-vehicle (V2V) communication through the wireless communication device 2130. That is, the wireless communication device 2130 may perform communication with another vehicle and other vehicles on the roads through the V2V communication. The autonomous vehicle 2000 may transmit and receive information, such as driving warnings and traffic information, through V2V communication and may also request another vehicle for information or may receive a request from the other vehicle. For example, the wireless communication device 2130 may perform the V2V communication using a dedicated short-range communication (DSRC) device or a celluar-V2V (CV2V) device. Also, in addition to the V2V communication, vehicle-to-everything (V2X) communication (e.g., communication between a vehicle and an electronic device carried by a pedestrian) may be implemented through the wireless communication device 2130.

Also, the control device 2100 may include the LIDAR device 2140. The LIDAR device 2140 may detect an object around the autonomous vehicle 2000 during an operation, based on data sensed using a LIDAR sensor. The LIDAR device 2140 may transmit the detected information to the controller 2120, and the controller 2120 may operate the autonomous vehicle 2000 based on the detection information. For example, when the detection information includes a vehicle ahead driving at a low speed, the controller 2120 may instruct the vehicle to decrease a speed through the engine 2006. Alternatively, the controller 2120 may instruct the vehicle to decrease a speed based on a curvature of a curve in which the vehicle enters.

The control device 2100 may further include the camera module 2150. The controller 2120 may extract object information from an external image captured from the camera module 2150, and may process the extracted object information using the controller 2120.

Also, the control device 2100 may further include imaging devices configured to recognize an external environment. In addition to the LIDAR device 2140, a radar, a GPS device, a driving distance measurement device (odometry), and other computer vision devices may be used. Such devices may selectively or simultaneously operate depending on necessity, thereby enabling a further precise sensing.

The autonomous vehicle 2000 may further include the user interface (UI) 2008 for a user input to the control device 2100. The UI 2008 enables the user to input information through appropriate interaction. For example, the UI 2008 may be configured as a touchscreen, a keypad, and a control button. The UI 2008 may transmit an input or an instruction to the controller 2120, and the controller 2120 may perform a vehicle control operation in response to the input or the instruction.

Also, the UI 2008 may enable communication between an external device of the autonomous vehicle 2000 and the autonomous vehicle 2000 through the wireless communication device 2130. For example, the UI 2008 may enable interaction with a mobile phone, a tablet, or other computer devices.

Further, although various example embodiments describe that the autonomous vehicle 2000 includes the engine 2006, it is provided as an example only. The autonomous vehicle 2000 may include a different type of a propulsion system. For example, the vehicle may run with electric energy, hydrogen energy, or through a hybrid system that is a combination thereof. Therefore, the controller 2120 may include a propulsion mechanism according to the propulsion system of the autonomous vehicle 2000 and may provide a control signal according thereto to each component of the propulsion mechanism.

Hereinafter, a configuration of the control device 2100 configured to scramble audio data according to various example embodiments is described with reference to FIG. 10.

The control device 2100 includes the processor 2124. The processor 2124 may be a general-purpose single or multi-chip microprocessor, a dedicated microprocessor, a microcontroller, a programmable gate array, and the like. The processor 2124 may also be referred to as a central processing unit (CPU). Also, according to various example embodiments, the processor 2124 may be a combination of a plurality of processors 2124.

The control device 2100 also includes the memory 2122. The memory 2122 may be any electronic component capable of storing electronic information. The memory 2122 may include a combination of memories 2122 in addition to a unit memory.

According to various example embodiments, data 2122b and instructions 2122a for scrambling audio data may be stored in the memory 2122. When the processor 2124 executes the instructions 2122a, the instructions 2122a and a portion or all of the data 2122b required to perform the instructions 2122a may be loaded to the processor 2124 as indicated with dotted lines 2124a and 2124b.

The control device 2100 may include a transceiver 2130c including a transmitter 2130a and a receiver 2130b, to allow transmission and reception of signals. At least one antenna, for example, antennas 2132a and 2132b may be electrically connected to the transceiver 2130c, that is, each of the transmitter 2130a and the receiver 2130b, and may include additional antennas.

The control device 2100 may also include a digital signal processor (DSP) 2170, and may control the vehicle to quickly process a digital signal through the DSP 2170.

The control device 2100 may also include a communication interface 2180. The communication interface 2180 may include at least one port and/or communication module configured to connect other devices to the control device 2100. The communication interface 2180 may enable interaction between the user and the control device 2100.

Various components of the control device 2100 may be connected through one or more buses 2190, and the one or more buses 2190 may include a power bus, a control signal bus, a state signal bus, and a database bus. The components may forward mutual information through the bus 2190 and may perform a desired function.

Figure 11:
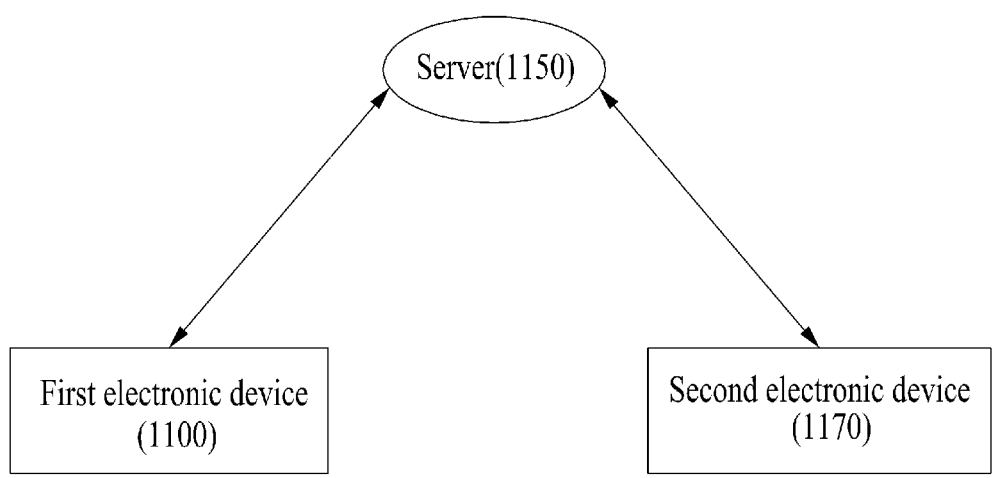
FIG. 11 is a diagram describing operations of a first electronic device configured to generate scrambled audio data, a server, and a second electronic device configured to descramble the scrambled audio data according to various example embodiments of the present disclosure.

FIG. 11 is a diagram describing operations of a first electronic device 1100 configured to generate scrambled audio data, a server 1150, and a second electronic device 1170 configured to descramble the scrambled audio data according to various example embodiments.

Referring to FIG. 11, the first electronic device 1100 may be the electronic device 100 of FIG. 1 and may be mounted to a vehicle. The second electronic device 1170 may be an electronic device, such as a smartphone, a tablet PC, and a desktop of a user, and may descramble scrambled audio data generated by the first electronic device 1100 and may provide the descrambled audio data to the user. The first electronic device 1100 and the second electronic device 1170 may include a configuration of the electronic device 100 of FIG. 1. Referring to FIG. 11, the server 1150 may connect to the first electronic device 1100 and the second electronic device 1170 through a wireless network or a wired network, and may manage the same secret key, counter, hash function, and sorting algorithm to be maintained between the two electronic devices 1100 and 1170 such that the descrambling module 750 of the second electronic device 1170 may successfully descramble the audio data scrambled by the scrambling module 240 of the first electronic device 1100. Also, in response to receiving video data and the scrambled audio data generated by the first electronic device 1100, the server 1150 may notify the second electronic device 1170 of the same. Here, it is desirable that the server 1150 may perform an authentication procedure in advance for a user of the second electronic device 1170 for security. If the notified user of the second electronic device 1170 requests downloading of the video data and the scrambled audio data generated by the first electronic device 1100, the server 1150 transmits the video data and the scrambled audio data to the second electronic device 1170. As described above, when the first electronic device 1150 transmits scrambled audio data to the server 1150 over the wireless network, a time interval (ΔT) may be determined based on a bandwidth and a data transmission rate of the wireless network. Also, the user of the first electronic device 1100 or the user of the second electronic device 1170 may subscribe to a different wireless communication service to upload or download video data and/or audio data to the server 1150. A processor of the first electronic device 1100 and/or a processor of the second electronic device 1170 uploads/downloads video data/audio data based on wireless communication service subscription information of the user stored in a memory. Also, the processor of the first electronic device 1100 and/or the processor of the second electronic device 1170 may upload/download video data/audio data based on a data transmission rate determined by scheduling of the server 1150 regardless of the wireless communication service subscription information of the user.

Hereinafter, an example embodiment in which the second electronic device 1170 descrambles the scrambled audio data generated by the first electronic device 1100 is described from perspective of user experience.

In detail, description is made with assuming a service that provides the second electronic device 1170 with the scrambled audio data generated by the first electronic device 1100 mounted to a vehicle.

Initially, once the first electronic device 1100 mounted to the vehicle connects to the server 1150, the user of the first electronic device 1100 subscribes to a service by inputting at least one of a password, user ID information, and electronic device ID information to the server 1150. Herein, the password, the user ID information, and the electronic device ID information are referred to as service subscription information. If the user subscribes to the service, the server 1150 generates scrambling related information, such as, for example, a secret key, a hash function, a counter, sorting algorithm information, and the like, for scrambling of the audio data and then transmits the generated scrambling related information to the first electronic device 1100. The server 1150 manages the scrambling related information through mapping to the service subscription information of the user.

If the scrambled audio data is generated by the first electronic device 1100, the server 1150 may store the scrambled audio data through mapping to the service subscription information of the user. Here, location information at which the scrambled audio data is generated may also be stored.

A process of downloading and installing an application from the server 1150 needs to be initially performed for the user of the second electronic device 1170 to be provided with the service. If the user completes installation of the application in the second electronic device 1170 and then inputs at least one of the password, the user ID information, and the electronic device ID information to a log-in screen, the server 1150 may identify that the user of the second electronic device 1170 is a user subscribing to the service.

Once authentication of the second electronic device 1170 is completed, the server 1150 verifies whether the scrambled audio data generated by the first electronic device 1100 is present, and, when the audio data is verified to be present, notifies the second electronic device 1170 of the same. If the user of the second electronic device 1170 requests the server 1150 to provide the scrambled audio data generated by the first electronic device 1100, the server 1150 retrieves the scrambled audio data corresponding to subscription information of the user and then transmits the scrambled audio data to the second electronic device 1170. Here, the server 1150 may also transmit location information at which the scrambled audio data is generated.

The second electronic device 1170 receiving the scrambled audio data from the server 1150 performs descrambling using the prestored secret key, counter, hash function, and sorting algorithm, and provides the descrambled audio data to the user. Here, the second electronic device 1170 may provide the user with location data together when providing the descrambled audio data, such that the user may verify a location at which the scrambled audio data is generated on map data. In detail, the second electronic device 1170 may display a visual object, such as an icon, indicating presence of the generated audio data in the location information with the location information at which the audio data is generated on the map data, through the output module 150 of FIG. 1. In response to a selection from the user on the object displayed on the displayed map data, the second electronic device 1170 may reproduce the generated audio data at a location at which the object is displayed.

Also, since the second electronic device 1170 is aware of the time interval (ΔT) and counter information about the audio data, a function that allows the user to directly access a specific section in the entire audio data section through a user experience (UE) screen. For example, if the counter information is 6, it indicates that the time interval (ΔT) is generated six times and the second electronic device 1170 may directly access a sixth scrambled audio data section. Therefore, a seeking time used to seek the specific scrambled audio data section may be reduced.

In addition, if it is used by not the user but a third part or a specific institution (e.g., an automobile manufacturing company, police, firefighting, insurance company, etc.) to verify information about incidents, accidents, etc., sufficient inference may be made only with the environmental sound (brake sound, collision sound, surrounding vehicle horn sound, etc.) occurring in relation to a corresponding incident or accident, without speech data of the user. As described above, the environmental sound is less sensitive to time. Therefore, although audio data including speech data and environmental sound data according to an example embodiment of the present disclosure is scrambled, the third party or the institution may sufficiently use the scrambled audio data for verification of the incident or the accident without descrambling the scrambled audio data.

According to still another example embodiment of the present disclosure, in response to occurrence of a specific event, the control device 2100 may transmit compressed data of video data acquired through the camera module 2150 and scrambled compressed audio data of audio data input through a microphone, to an external third party or institution through the communication interface 2180. Here, the specific event may include a case in which a predetermined impact is detected by the sensor module 160, a case in which sudden deceleration/quick acceleration occurs, and a case in which a data transmission request instruction is received from an outside through the communication module 130.

Also, according to still another example embodiment of the present disclosure, the control device 2100 may control the communication interface 2180 to change an upload speed of the compressed video data and the compressed audio data based on a data transmission rate or a bandwidth when transmitting the same to the outside through the wireless network.

Various example embodiments herein may be implemented as software (e.g., program) that includes at least one instruction stored in a machine (e.g., the electronic device 100) and a storage medium (e.g., the memory 170) readable by the control device 2100. For example, the machine (e.g., the electronic device 100) and the processor (e.g., the processor 180 and the processor 2124) of the control device 2100 may call at least one instruction from among the stored one or more instructions from the storage medium and may execute the called at least one instruction, which enables a device to operate to perform at least one function according to the called at least one instruction. The at least one instruction may include a code generated by a compiler or a code executable by an interpreter. A machine-readable storage medium may be provided in a form of a non-transitory record medium. Here, "non-transitory" simply indicates that the record medium is a tangible device and does not include a signal (e.g., electromagnetic wave). This term does not distinguish a case in which data is semi-permanently stored and a case in which the data is temporarily stored in the record medium.

According to an example embodiment, the methods according to the various example embodiments disclosed herein may be included in a computer program product and thereby provided. The computer program product refers to commodity and may be traded between a seller and a buyer. The computer program product may be distributed in a form of a record medium (e.g., compact disc read only memory (CD-ROM)), or may be distributed (e.g., downloaded or uploaded) only or directly through an application store (e.g., PlayStore™) or may be distributed directly or online between two user devices (e.g., smartphones). In the case of online distribution, at least a portion of the computer program product may be at least temporarily stored in a storage medium readable by a device, such as a server of a manufacturer, a server of the application store, or a memory of a relay server.

The various example embodiments and the terms used herein are not construed to limit the technique described herein to specific example embodiments and may be understood to include various modifications, equivalents, and/or substitutions. Like reference numerals refer to like elements throughout. As used herein, the singular forms "a," "an," and "the," are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe various components and the components should not be limited by the terms. The terms are simply used to distinguish one component from another component. When a component (e.g., a first component) is described to be "(functionally or communicatively) connected to" or "accessed to" another component (e.g., a second component), the component may be directly connected to the other component or may be connected through still another component (e.g., a third component).

The term "module" used herein may include a unit configured as hardware, software, or firmware, and may be interchangeably used with, for example, the terms "logic," "logic block," "part," "circuit," etc. The module may be an integrally configured part, a minimum unit that performs at least function, or a portion thereof. For example, the module may be configured as an application-specific integrated circuit (ASIC).

According to various example embodiments, each component (e.g., module or program) of the aforementioned components may include a singular entity or a plurality of entities. According to various example embodiments, at least one component among the aforementioned components or operation may be omitted, or at least one another component or operation may be added. Alternately or additionally, the plurality of components (e.g., module or program) may be integrated into a single component. In this case, the integrated component may perform the same or similar functionality as being performed by a corresponding component among a plurality of components before integrating at least one function of each component of the plurality of components. According to various example embodiments, operations performed by a module, a program, or another component may be performed in parallel, repeatedly, or heuristically, or at least one of the operations may be performed in different order or omitted. Alternatively, at least one another operation may be added.

What is claimed is:

1. An electronic device comprising:
a camera module configured to collect a video signal;
an input module configured to collect an audio signal while the video signal is being collected; and
a processor configured to connect to the camera module and the input module,
wherein the processor is configured to
acquire video data and audio data,
scramble the audio data in non-time order, and
store the video data and the scrambled audio data together.

2. The electronic device of claim 1, wherein the processor comprises a scrambling module configured to scramble the audio data in non-time order at time intervals.

3. The electronic device of claim 2, wherein the time interval is a length of the scrambled audio data.

4. The electronic device of claim 2, wherein the time interval varies using an algorithm that generates a series of numerical values using a secret key.

5. The electronic device of claim 4, wherein the scrambling module is configured to acquire the time interval from the secret key using a hash function, according to the algorithm.

6. The electronic device of claim 5, wherein at least one of the hash function and the secret key is prestored in the scrambling module, or is received from an outside and stored in the scrambling module.

7. The electronic device of claim 5, wherein at least one of the hash function and the secret key is shared with a descrambling module configured to descramble the scrambled audio data.

8. The electronic device of claim 1, wherein the processor is configured to synchronize a start point in time of the video data with a start point in time of the scrambled audio data and to store the video data and the scrambled audio data together.

9. The electronic device of claim 2, wherein the scrambling module is configured to scramble audio samples in the audio data of the time interval in non-time order arbitrarily determined in an algorithm, and the arbitrarily determined non-time order is shared with a descrambling module configured to descramble the scrambled audio data.

10. The electronic device of claim 2, wherein the processor comprises:

a video processing module configured to process the video signal collected from the camera module to the video data;

an audio processing module configured to process the audio signal collected from the input module to the audio data;

an audio compression module configured to compress the scrambled audio data; and a video compression module configured to compress the video data.

11. An operating method of an electronic device, the method comprising:

acquiring video data and audio data;

scrambling the audio data in non-time order; and storing the video data and the scrambled audio data together.

12. The method of claim 11, wherein the scrambling of the audio data in non-time order comprises scrambling the audio data in non-time order at time intervals.

13. The method of claim 12, wherein the time interval is a length of the scrambled audio data.

14. The method of claim 12, wherein the time interval varies using an algorithm that generates a series of numerical values using a secret key.

15. The method of claim 14, wherein the scrambling of the audio data of the time interval in non-time order comprises:

acquiring the time interval from the secret key using a hash function, according to the algorithm; and scrambling the audio data of the time interval in non-time order.

16. The method of claim 15, wherein at least one of the hash function and the secret key is prestored in the electronic device, or is received from an outside and stored in the electronic device.

17. The method of claim 15, wherein at least one of the hash function and the secret key is shared with a descrambling module configured to descramble the scrambled audio data.

18. The method of claim 11, wherein the storing of the video data and the scrambled audio data together comprises synchronizing a start point in time of the video data with a start point in time of the scrambled audio data and storing the video data and the scrambled audio data together.

19. The method of claim 12, wherein the scrambling of the audio data of the time interval in non-time order comprises scrambling audio samples in the audio data of the time interval in non-time order arbitrarily determined in an algorithm, and wherein the arbitrarily determined non-time order is shared with a descrambling module configured to descramble the scrambled audio data.

20. The method of claim 11, wherein the storing of the video data and the scrambled audio data together comprises:

compressing the scrambled audio data;

compressing the video data; and storing the compressed audio data and the compressed video data together.

* * * * *